Jan. 9, 1951 — A. H. WITTE — 2,537,727

LAWN EDGER

Filed June 23, 1948 — 2 Sheets-Sheet 1

Arthur H. Witte
INVENTOR.

Jan. 9, 1951  A. H. WITTE  2,537,727
LAWN EDGER
Filed June 23, 1948  2 Sheets-Sheet 2
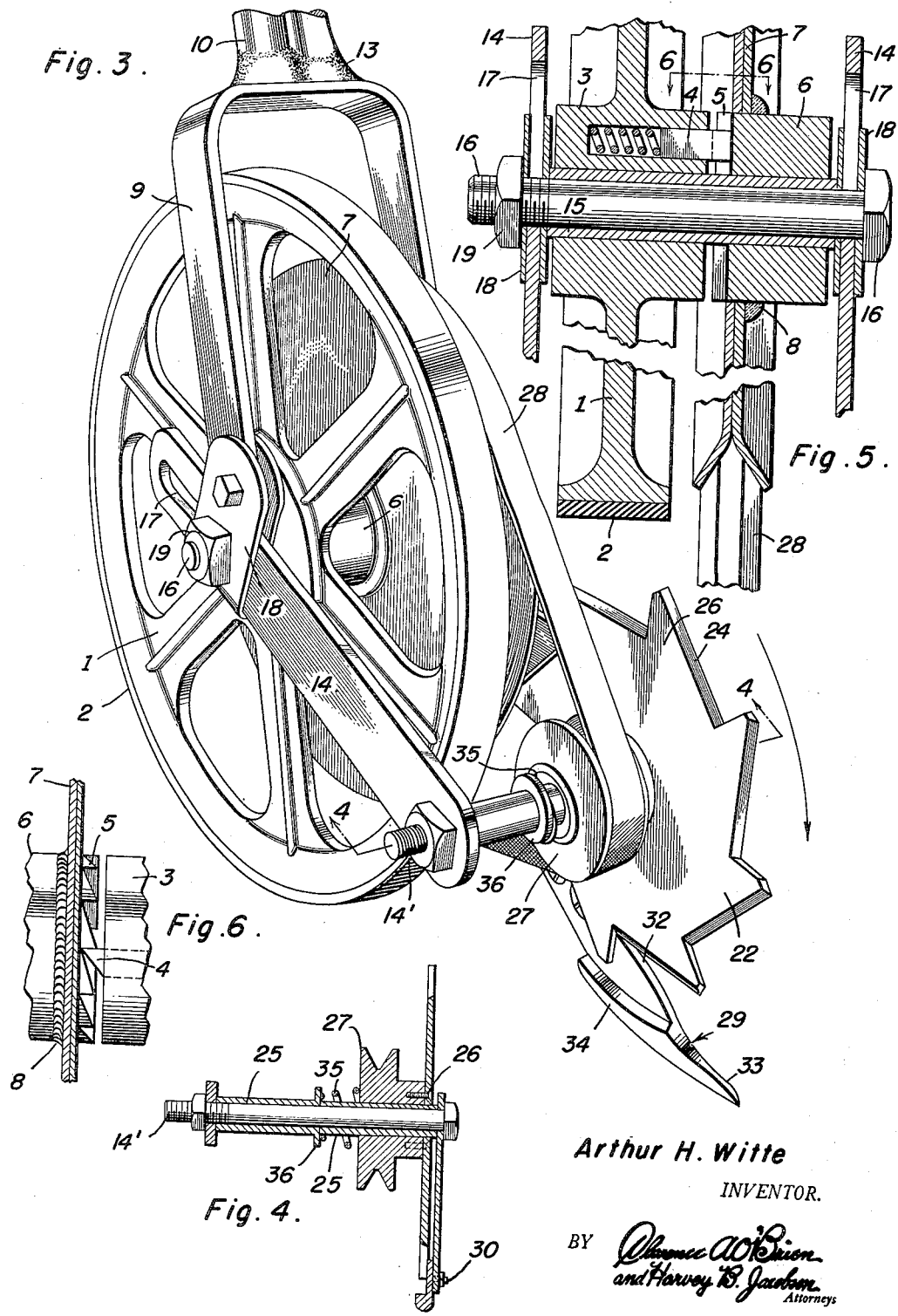
Arthur H. Witte
INVENTOR.

Patented Jan. 9, 1951

2,537,727

UNITED STATES PATENT OFFICE 2,537,727

LAWN EDGER

Arthur H. Witte, El Dorado Springs, Mo.

Application June 23, 1948, Serial No. 34,630

1 Claim. (Cl. 56—256)

My invention relates to improvements in lawn edgers for trimming grass at the edges of sidewalks, and the like.

The primary object of the invention is to provide an easily handled, rotary edging device equipped for pushing along one edge of a walk to cut grass along said edge and which is especially designed to cut with a rotary shearing action so as to trim along the edge of the walk easily and evenly.

Another object is to provide a device of the character and for the purposes stated which is adapted to straighten up the grass for cutting and for propelling back and forth along the walk while trimming continuously.

Still another object is to provide a lawn edger of simple construction and few parts adapted the same for economical manufacture and low retail cost, and which requires a minimum of servicing and will not get out of order under prolonged use.

Other and subordinate objects, within the purview of my invention, together with the precise nature of my improvements will be readily understood when the succeeding description and claims are read with reference to the drawings accompanying and forming part of this specification.

In said drawings:

Figure 3 is a view similar to Figure 2 with the edger viewed from the outboard side thereof;

Figure 4 is a view in vertical section taken on the line 4—4 in Figure 3;

Figure 5 is a view in horizontal section taken on the line 5—5 of Figure 2;

Figure 6 is a fragmentary view in vertical section taken on the line 6—6 of Figure 5.

Figures 1, 2:
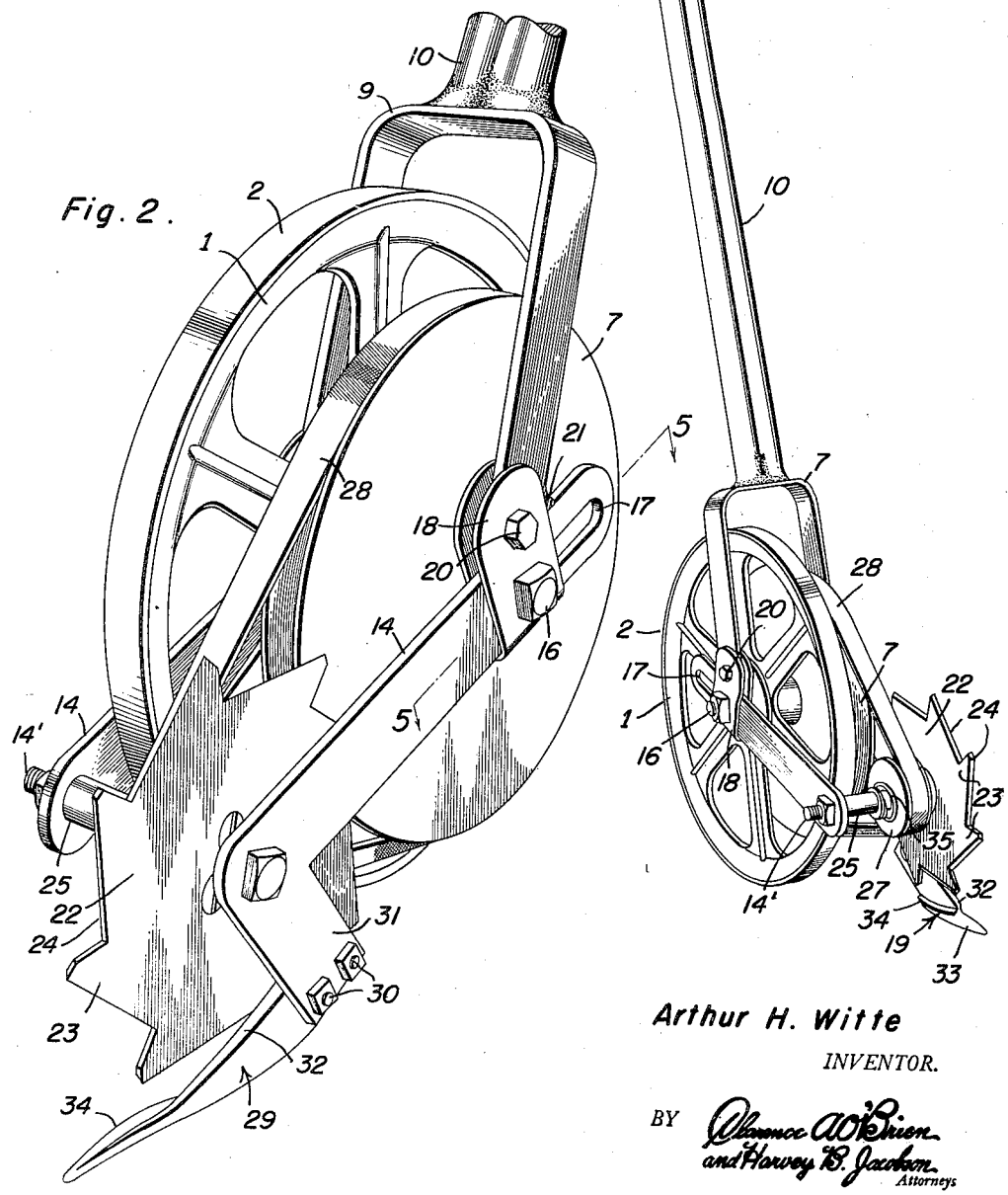
Figure 1 is a view in perspective of my improved lawn edger, in a preferred embodiment thereof, viewed from the outboard side of the same.
Figure 2 is a fragmentary view in perspective viewed from the inboard side of the edger, and drawn to a larger scale.

Referring to the drawings by numerals, the lawn edger of my invention comprises a driving ground wheel 1 for rolling along the edge of a walk, not shown, with a flat resilient tire 2 and a hub 3 operatively connected by a spring pressed, side, ratchet bar 4 slidable in the hub 3 to side ratchet teeth 5 on a hub 6 of a larger cutter wheel driving belt pulley 7 welded to said hub 6, as at 8. The ratchet bar 4 and the ratchet teeth 5 are arranged so that under forward travel of the ground wheel 1 the pulley 7 is driven, whereas, under backward travel of said wheel 1, said pulley 7 is rendered idle. The pulley 7 is arranged on what constitutes the inboard side of the ground wheel 1.

The ground wheel 1 and the pulley 7 are rotatively mounted, as presently described, in a fork 9 on the lower end of an elongated pusher handle 10 provided with oppositely turned, lateral handle bars 11 having suitable hand grips 12 thereon. The handle 10 may be inexpensively formed of a pair of side by side pipes suitably connected together and bent to form the handle bars 11, the thus formed handle 10 being welded, as at 13, to the fork 9. The mounting for the ground wheel 1, and the pulley 7, comprises a pair of yoke bars 14 extending from the fork 9 forwardly of the ground wheel 1 and pulley 7 upon the outboard and inboard sides of said wheel and pulley, respectively, and between which said wheel 1 and pulley 7 are rotatable on a bushing 15 surrounding a spindle bolt 16 which extends at its ends through longitudinal rear end slots 17 in the yoke bars 14, and through a pair of inverted U-shaped clips 18 straddling the yoke bars 14. A nut 19 on the spindle bolt 16 clamps the clips 18 to the ends of the bushing 15 clear of the hubs 3 and 6. The slots 17 provide for longitudinal adjustment of the yoke bars 13 forwardly and rearwardly of the ground wheel 1 and pulley 7, for a purpose presently seen. The fork 9 is pivoted by bolts 20 in the clips 18 above the yoke bars 14 to be swung forwardly and rearwardly relative to said yoke bars 14, and is provided with a pair of rear edge lugs, one of which is shown at 21, for bearing downwardly on said bars 14 to limit rearward swinging of the yoke 9 and the handle 10 relative to said bars 14, for a purpose presently apparent.

A toothed cutter wheel 22 the teeth 23 of which are provided with tangential cutting edges 24 is rotatably mounted between the front ends of the yoke bars 14 to rotate about a horizontal axis, by the following means. A spindle bolt 25 connects the front ends of said bars 14 with a pair of bushings 25 thereon arranged end to end and spacing the front ends of said bars 14 apart. The cutter wheel 22 is secured by screws 26 to one side of a pulley 27 smaller than the pulley 7 and which is rotatable on one of bushings 25 in the plane of the pulley 7 with the cutter wheel 23 offset on the inboard side of said pulley 27. A belt 28 operatively connects the pulley 7 to the pulley 27. The cutter wheel 22 coacts with a cutter and pickup member now to be described.

The cutter and pickup member comprises an elongated ground engaging runner shoe 29 at the bottom and on the inboard side of the cutter wheel 22. The runner shoe 29 is bolted, as at 30, to a depending front extension arm 31 on the yoke bar 14 on the inboard side of the pulley 27. The runner shoe 29 is provided with an upwardly and rearwardly inclined, top, cutting edge 32 against which the cutting edges 24 of the teeth 23 revolve downwardly to cut with a shearing action. The runner shoe 29 is formed, forwardly of the edge 32, with a pickup toe 33 for riding over the ground under grass to straighten up the same for cutting. A lower edge, side flange 34 on the runner shoe 29 is adapted to engage the edge of a walk, not shown, to space the cutter wheel 22 therefrom and thereby prevent said wheel from being damaged by the walk.

A coil spring 35 on one bushing 25 is interposed between the pulley 27 and a flange 36 on the other bushing 25 and yieldingly urges the cutter wheel 22 laterally against the cutting edge 32 of the runner shoe 29.

As will now be seen, with the ground wheel 1 pushed along the edge of a walk, and the runner shoe 29 riding on the ground alongside said edge, the cutter wheel 22 will be guided by said shoe to cut close to said edge, the cutter wheel 22 being rotated clockwise, as indicated by the arrow in Figure 3, under forward travel of the ground wheel 1 to cut in cooperation with the cutting edge 32 of the runner shoe 29, in the manner already described. As the runner shoe 29 travels over the ground, the toe 33 thereof picks up and straightens up the grass at the edge of the walk so that the same will be interposed between the cutting edge 32 and the edges 24 of the teeth 23. Pushing on the handle 10 tends to rock the yoke bars 14 downwardly about the axis of the spindle bolt 16, through the clips 18, to maintain the runner shoe 29 on the ground while permitting the same to ride over uneven surfaces. By swinging of the handle 10 downwardly and rearwardly to engage the lugs 21 with the yoke bars 14 pressure will be exerted downwardly against said bars in the rear of the spindle bolt 16 to swing said bars 14 upwardly in front of the ground wheel 1 whereby the cutter wheel 22 and runner shoe 29 may be raised out of effective position when desired. By pushing the ground wheel 1 forwardly to cause operation of the cutter wheel 22 with sufficient momentum, the ground wheel 1 may be pulled backwardly while the cutter wheel 22 is operated under momentum, so that the edger may be operated forwardly and backwardly along a walk with short strokes rendering handling of the same easy.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention, what is claimed as new is:

In a lawn edger, a ground wheel for propelling forwardly along one edge of a walk, a spindle on which said wheel is rotatably mounted, a pair of yoke bars on said spindle extending forwardly of said wheel upon opposite sides thereof, a toothed cutter wheel rotatable between said bars about a horizontal axis for rotation alongside said edge of the walk in spaced relation thereto, means on one bar extending below said cutter wheel and with which the teeth of the cutter wheel coact with a shearing action, a drive between the ground and cutter wheel, and a handle for propelling the ground wheel mounted on said bars, said means comprising a ground engaging runner shoe with a cutting edge past which the teeth of the cutting wheel revolve, and spring means urging said cutter wheel laterally against said cutting edge, said shoe having a side flange for engaging the edge of the walk to space the cutting wheel from said edge.

ARTHUR H. WITTE.

REFERENCES CITED

The following references are of record in the file of this patent:

UNITED STATES PATENTS

| Number | Name | Date |
|---|---|---|
| 369,227 | Calmeyn | Aug. 30, 1887 |
| 1,238,595 | Sundholm | Aug. 28, 1917 |
| 1,912,893 | Engel | June 6, 1933 |